Oct. 29, 1968 R. D. COOKSLEY 3,407,845
ELECTROMAGNETICALLY OPERATED VALVES
Filed Nov. 17, 1964 4 Sheets-Sheet 1

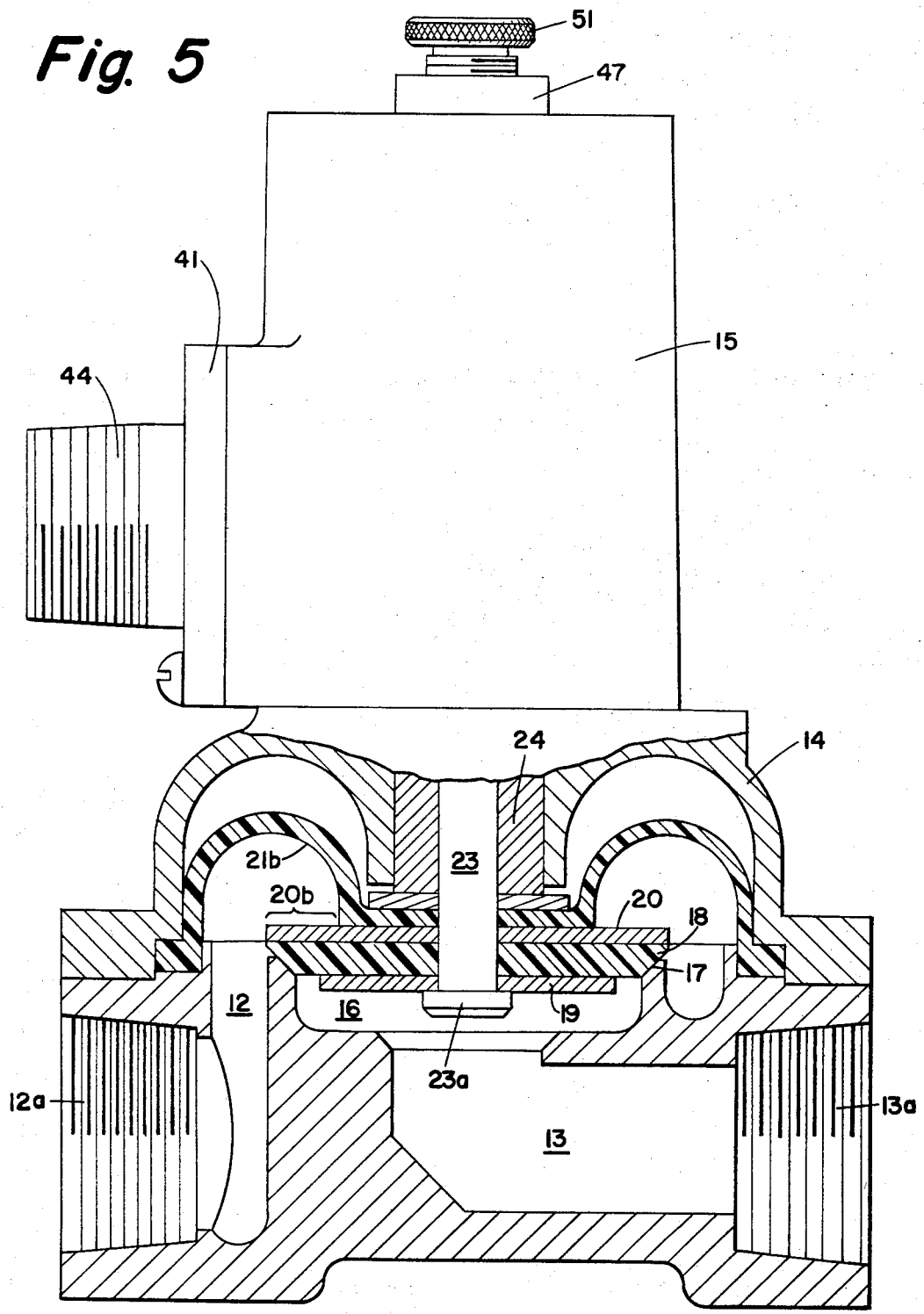

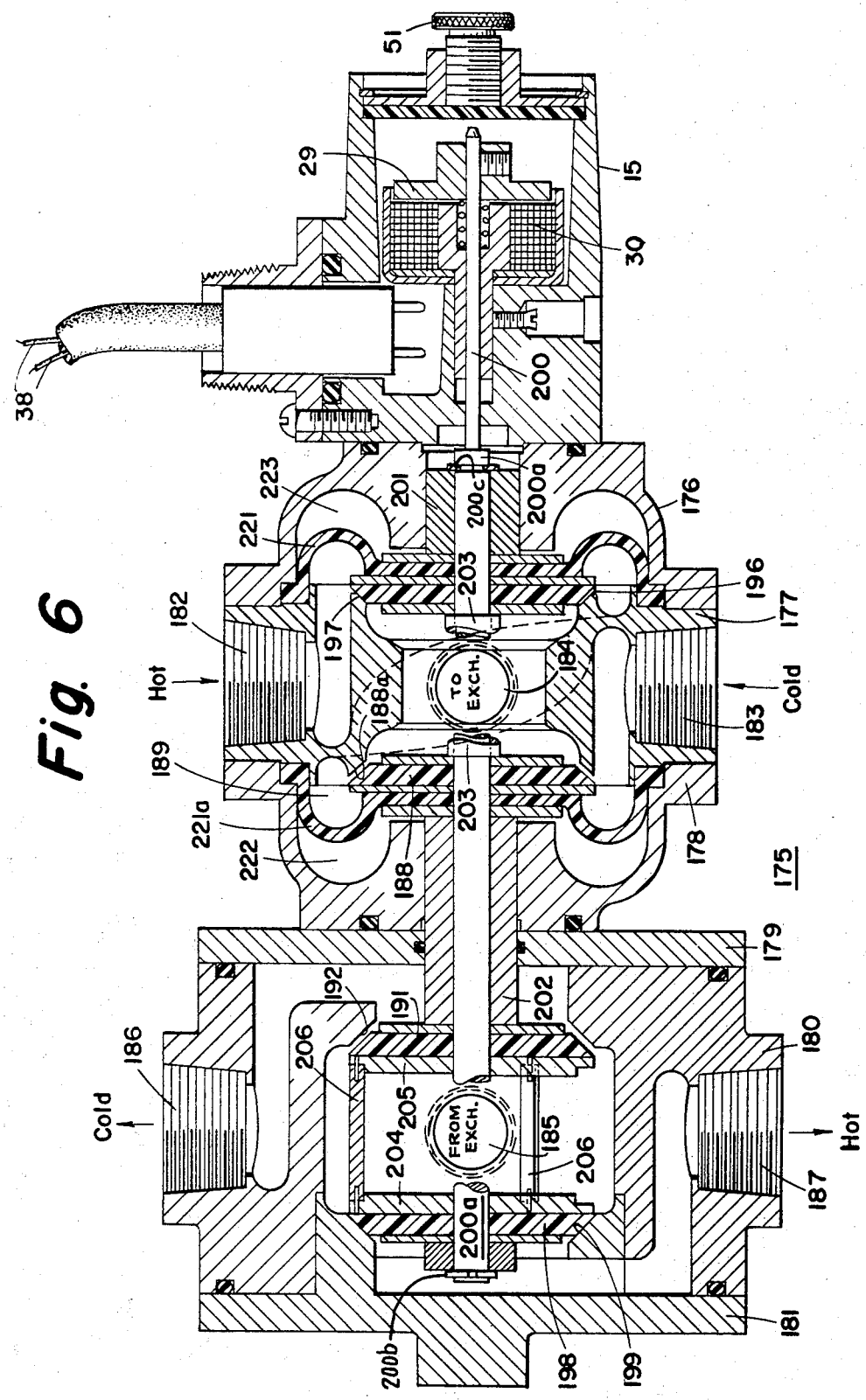

United States Patent Office 3,407,845
Patented Oct. 29, 1968

3,407,845
ELECTROMAGNETICALLY OPERATED VALVES
Ralph D. Cooksley, Saugatuck Shore, Conn., assignor to
R. D. Cooksley Manufacturing Company, Hartford,
Conn., a corporation of Connecticut
Continuation-in-part of application Ser. No. 314,236,
Oct. 7, 1963. This application Nov. 17, 1964, Ser.
No. 411,899
9 Claims. (Cl. 137—607)

ABSTRACT OF THE DISCLOSURE

A magnetically-operated valve is provided with a valve member and valve opening which is quite large in flow area compared with the flow areas of the inlet and outlet ports. By providing stop means for the valve member, its movement is restricted so that with a very short valve stroke, the opening through the valve will be equal to the area of one of the inlet and outlet ports. Accordingly, the armature of the magnetic actuator can be restricted for movement within an overlapping area of a cup-shaped stationary member to provide relatively high forces for actuating the valve with a minimum of power. The foregoing features are included in a variation comprising a six-way valve for control of fluid flow between two inlet ports and two outlet ports. Two additional ports are respectively flow-connected to a heat-exchanger by way of the inlet and outlet ports. The valves also include structure for preventing water-hammer.

---

This application is a continuation-in-part of my application Ser. No. 314,236, filed Oct. 7, 1963, now Patent No. 3,306,570.

This invention relates to valves, particularly of the type adapted for operation by magnetic operating devices, and has for an object the provision of a valve with a stroke length between fully open and closed positions so small as to take advantage of the maximum operating forces developed by the valve during the initial portion of the stroke movement.

Though magnetic valves have long been proposed and utilized, nevertheless they have left much to be desired for the reason that a solenoid actuator has the characteristic of developing a very low magnitude of operating force with the armature or solenoid core in its remote position from the stationary coil and associated magnetic structure. This characteristic of magnetic actuators has made it difficult to produce valves of compact design and valves which require a low order of power for their actuation. Additionally, upon the rapid closing of the valve, water-hammer occurs and to avoid water-hammer further and additional provisions must ordinarily be made.

In carrying out the present invention in one form thereof, there is provided a valve body having inlet and outlet ports in flow connection one with the other through a passage. A valve seat forms the outer periphery of this passage and by means of a valve member movable into and out of engagement with the passage, the valve may be opened and closed. The passage and the valve seat have a diameter which provides an area for flow of fluid through the valve which is large compared with the area of the inlet and outlet ports. This means that the valve member need be moved but a small distance in order to provide a flow passage equal to the maximum flow passage of the inlet and outlet ports. By thus reducing the required length of stroke of the valve member and its associated stem, the armature of a magnetic actuator need be moved but a short distance fully to open and close the valve. Accordingly, the armature of the magnetic actuator can be arranged to move within a region overlapping a part of its spaced core structure. This means that the magnetic actuator develops substantially its maximum force at the beginning of the stroke and assures rapid operation of the valve between its fully open and closed positions. This is in contrast with solenoids including a plunger and in contrast with other types of magnetic actuators where the operating force is quite low at the beginning of the stroke due to the wide spacing of the armature from the magnetic structure, i.e., the large air gap. In solenoids, the actuating force rises from a low value to a maximum and then decreases as the core approaches a magnetic center or neutral position. Moreover, the magnetic flux path is never closed in a solenoid as it is in the magnetic actuator of the present invention. Additionally, the magnetic actuator of the present invention lends itself to an explosion-proof construction, being sealed against ingress and egress of all fluids, and utilizes power of a low order of magnitude compared with that needed to develop corresponding forces by soleniods. It is further characterized by the use of direct current, low losses, and minimized heating. Possibility of failure from an undue rise of temperature under continuous operation and in high-temperature ambient conditions is avoided. With power failure, the valve may be manually actuated.

Notwithstanding that the valve member opens and closes a large diameter flow area as compared with the diameters of the inlet and outlet ports, nevertheless there is attained balanced operation by reason of oppositely acting pressures on the valve member which further reduces the power requirements of the magnetic actuator in either direction. In this connection, it will be seen that increasing the diameter of a valve member greatly increases the area subjected to a differential of pressure and, hence, greatly increases the actuating force required to move the valve member against the upstream pressure. The present invention provides a balancing pressure which overcomes the aforesaid problem.

Further in accordance with the invention, the valve stem has secured to it a diaphragm which serves to seal at its periphery the valve body and an associated housing, which housing is provided with a toroidal-shaped chamber within which a correspondingly shaped outer portion of the diaphragm is disposed. Upon fast operation of the valve, the toroidal-shaped portion of the diaphragm expands and compresses air within the toroidal-shaped chamber, thus taking up the shock which otherwise could produce water-hammer and shocks on the piping system. The diaphragm additionally is tightly clamped to the valve stem and thus isolates the housing from the valve body.

It is through the action of the aforesaid diaphragm that the balancing forces are applied to the valve member so that low operating forces are required though the valve member may have an area twice that of the inlet and outlet ports.

The valve may be either normally closed or normally open with the parts for the two types of valves for the most part being interchangeable. It is both compact and reliable in operation.

For further objects and advantages of the invention and for a detailed discussion of several embodiments thereof, reference is to be had to the following description taken in conjunction with the accompanying drawings in which:

FIG. 5 is a sectional view of a modified form of the invention; and

FIG. 6 is a sectional view of a six-way valve embodying the invention.

Figure 1:
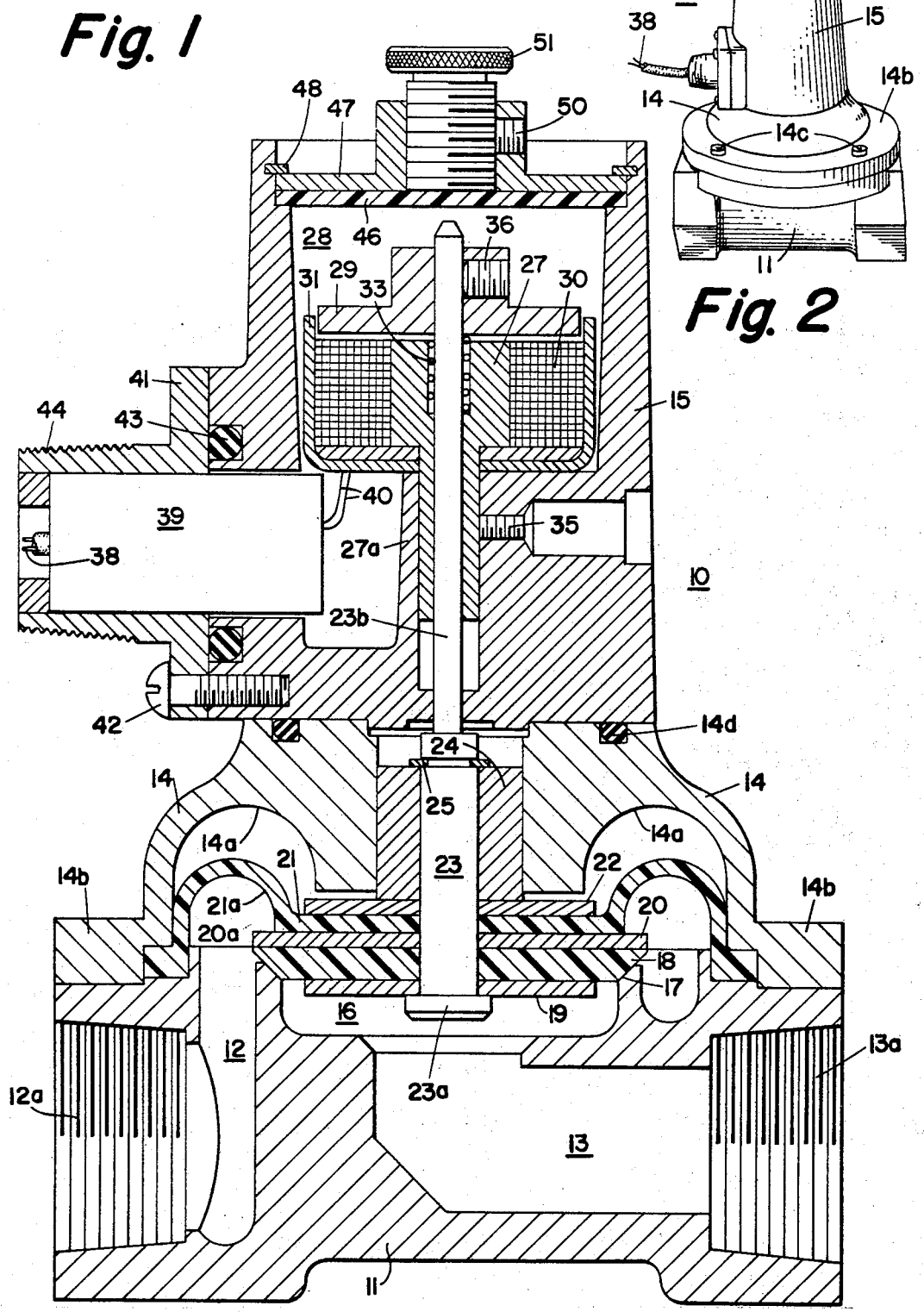
FIG. 1 is a sectional view of a normally open valve embodying the invention.

Referring now to FIG. 1, there has been illustrated in the closed position a normally open valve 10 comprising a valve body 11 having an inlet port 12 and an outlet port 13. A threaded opening 12a is provided for threaded connection to a length of pipe forming part of the piping system. The inlet port 12 is kidney-shaped and its net flow area is approximately equal to the cross-sectional flow area of opening 12a and also that of the outlet port 13. The latter port is likewise provided with a threaded opening 13a for a discharge pipe which will be threaded therein. In this connection, it is to be understood that pipes may be soldered or brazed to the valve body 11. As explained in my copending application, Ser. No. 314,236, filed Oct. 7, 1963, the valve body 11 may be made a component part of a piping system in the absence of the operating structure associated with the valve and carried by a valve housing 14 and an associated magnetic actuator within the housing 15. An O-ring 14d provides a tight seal between the valve housing 14 and the housing of an actuator 15.

The outlet port 13 communicates with a passage 16 having a diameter which provides for the passage 16 a flow area much greater than that of the inlet port 12 and of the outlet port 13. It is made much greater so that the movement of a valve member 18 toward and away from the seat 17 need have but a very short length of travel fully to open the valve. Thus, the seat 17 lies at the periphery of the enlarged passage 16 and is preferably of frusto-conical shape as illustrated. By fully open is meant a movement of the valve member 18 which opens a flow passage of area at least equal to the smaller flow area of the inlet and outlet ports 12 and 13 and their associated piping. As shown, the inlet and outlet lines as well as inlet and outlet ports 12 and 13 have flow areas approximately equal one to the other.

The valve member 18 is made of a material best suited to the particular fluids to be controlled by the valve. In one form of the invention a synthetic rubber-like resin generally designated as Buna-s has been found satisfactory for a wide variety of applications including air and water. The valve member 18 is clamped between two metallic discs or washers 19 and 20. A headed end 23a of a valve stem 23 supports the lower reinforcing disc 19.

Figure 2:
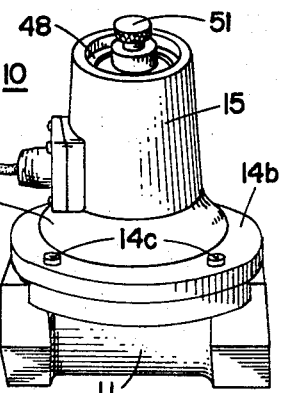
FIG. 2 is a three-dimensional drawing of the valve at a much reduced scale over that of FIG. 1 and illustrates the outward appearance and compactness of the valve.

Overlying the disc 20 is a diaphragm 21 which also may be made of any suitable flexible material preferably Buna-s rubber. It has a disc-shaped central portion of less diameter than the reinforcing disc 20, the central portion terminating in an upwardly extending toroidal-shaped portion which is semi-circular in cross-section. The outer periphery 21b is of thickened cross section and is disposed between the valve body 11 and a recessed notch provided by the housings 11 and 14. The three surfaces which clamp the thickened periphery 21b not only provide a tight leak-proof seal but also anchor the outer periphery against movement by valve-balancing forces later described in detail. The housing 14 is secured to the valve body 11 by suitable fastening screws 14c, FIG. 2. Thus, the diaphragm 21 with its toroidal-shaped section 21a and its flange 21b, together with the flat section, forms a seal between the inner portion of housing 14 and the flow passages from inlet to outlet of the valve.

Disposed above the flat central portion of the diaphragm 21 is a clamping disc 22 against which there is disposed a cylindrical member or collar 24 nesting within an enlarged central opening of the housing 14. It will be observed that the stem 23 is provided with an annular groove in which is disposed a locking ring 25 of the split-type. The length of the collar 24 is such that when pressed downwardly to its illustrated position, during initial assembly of the valve, it places the flat central part of the diaphragm 21 under compression and likewise places under compression between discs 19 and 20 the valve member 18. Thus, the split-ring 25 holds together the assembly as a whole.

The valve stem 23 has a length 23b of reduced cross-sectional area which extends upwardly through a downwardly depending leg 27a of the central magnetic structure 27 of the magnetic actuator 28. The magnetic actuator 28 has an armature 29, an operating coil 30 and an outer magnetic structure 31 which is cup-shaped with the length of the cylindrical portion somewhat greater than that of the central portion 27 for disposition of the armature within the magnetic field produced by coil 30. As shown, the coil 30 is energized and the magnetic field extends by way of the central part 27 of the core structure outwardly around the lower flat portion of the cup-shaped structure upwardly along the cylindrical portion across the very narrow peripheral air gap, thence through the armature, and back to the central position.

As shown, the air gap between the armature 29 and the upper surface of the central core member 27 is greatly exaggerated. In practice, this air gap is zero or substantially so. By the narrow circumferential air gap between the periphery of the armature and the inner surface of the cup-shaped core member, the effect of residual magnetism, upon deenergization of coil 30, is overcome and a relatively light spring 33 may be used to assure opening of the valve.

The central inner core structure 27 is counterbored to provide space for the biasing spring 33 which bears against the armature 29 to apply an upward valve-opening force thereto. The coil 30 is sealed into the cup-shaped magnetic structure 31 and to the inner core structure 27 by conventional potting compound. The core 27 has its extending portion 27a secured to housing 15 by means of a set screw 35.

In assembling the valve, a locking screw 36 of armature 29 is assumed to be out of engagement with the upper end of the valve stem 23b. Hence, by pressing downwardly on the tapered upper end of the valve stem 23b, the valve member 18 may be pressed downwardly against the valve seat with any selected magnitude of valve-closing pressure. With the stem held in that position, against the opening biasing force of spring 33, the set screw 36 is tightened, as by an Allen-wrench and the valve is thereby made ready for operation.

As explained in my copending application, power may be supplied through conductors 38 which lead into an assembly 39 comprising a half-wave or preferably a full-wave rectifier for application as by conductors 40 of direct current to the coil 30. By utilizing direct current, a much greater attractive effort may be developed for a given size coil and a given size of magnetic structure and has the further advantage of eliminating entirely chatter which would be present if alternating current were utilized.

It is to be observed that the mounting assembly for the rectifier assembly 39 comprises a flange 41 secured to the upper body member 15 as by a plurality of set screws 42, an O-ring 43 providing a gas-tight seal. The flange 41 terminates in a threaded nipple-portion 44 to receive piping for the conductors which are themselves preferably sealed into the rectifier assembly 39. Thus, with the seal provided by a diaphragm 46, there is provided an explosion-proof assembly.

The housing 15 is sealed at its open upper end by means of a flexible diaphragm 46 held in place by a flange member 47 which itself is locked into position by a split ring 48 nesting within an annular groove in the upper end of housing 15. In the event of power failure at the conductors 38, it will be understood that the spring 33 will move the stem and valve member 18 upwardly to open the valve. In the event that it is to be closed manually, a set screw 50 may be loosened and a knurled rim of a threaded actuating member 51 then turned in a direction to press downwardly on the diaphragm 46 to engage the upper end of the valve stem 23b, thus to produce movement of the valve member 18 to its closed position against the seat 17.

The manually operable member 51 may also be used as an adjustable stop member to predetermine the extent of movement of valve member 18 toward open position. Thus, that movement may be less than permitted by engagement of the upper surface of disc 22 against the lower flat, centrally located surface of housing member 14.

In normal operation, the supply circuit 38 from the ordinary alternating current supply lines need be but opened and closed to operate the valve from its normally open position to its closed position. It is to be noted that the movement or valve stroke between normally open and normally closed positions is very short. It is made short so that the armature 29 always has a part of its outer periphery within the confines of the upper end of the cup-shaped armature structure 31, that is, both in the fully open and fully closed positions. This means that substantially the maximum force developed by the magnet is available at the initial portion of the movement of the valve from its open position to its closed position. The result is an extremely fast action, only one-thirtieth of a second being required, for valves having the following typical dimensions. For an inlet port of one-quarter inch diameter, or equivalent, the passage 16 will have a one-inch diameter. This means that the valve member 18 need to be moved but 0.016 inch to provide a flow passage at the valve seat 17 equal to that of the inlet and outlet ports.

For half-inch inlet and outlet ports, the same one inch passage 16 may be utilized since in that case the movement of the valve member 18 will only be 0.063 inch.

If the same valve be used for either application, it is to be understood that the needed stroke length may be predetermined by presetting the stop member 51 by its knurled portion and then locking it into place by the set screw 50.

Where the passage 16 has a diameter of 1.625 inches, then the needed stroke for the quarter-inch ports will be but 4/100 inch, and for the half-inch ports, the stroke will only be 5/100 of an inch.

The foregoing is illustrative of how the dimensions may be changed to take advantage of the principles of the present invention to meet many different requirements.

It is important to the present invention to have a pressure-balanced valve operation. Thus, with the inlet pressure applied through the inlet port 12 and with the parts in the positions shown in FIG. 1, it will be seen that the inlet pressure is acting upon the arcuate portion 21a of the diaphragm sealing member 21, which through its mechanical connection to the valve member, tends to move it and the stem 23 upwardly and towards the open position. However, the circumferential area 20a receives the same inlet pressure and acts in the opposite direction to move the valve member and the stem 23 toward closed position. These areas provide substantial balancing of the forces on the valve member 18 and stem 23. Thus, the requirements for opening the valve are satisfied by a relatively light spring 33. Of course, where the valve is power-opened, FIG. 6, the same advantages accrue, and such a type of valve will also later be described in connection with FIG. 3.

In connection with the balancing action, the material of which the diaphragm is made is important for the reason that with the valve member closed, the arcuate portion 21a must be sufficiently resistant to expansion that the upwardly-acting force at all times remains effective on the valve member and stem 23. For high-pressure valves, as 125 pounds per square inch, the durometer hardness of the synthetic rubber material will be greater, i.e., of the order of 80 to 90 as against a durometer hardness of 60 to 70 for low-pressure valves. Thus, for valves, roughly rated for 40 to 50 pounds per square inch, the low durometer hardness will be used, and for valves up to 125 pounds per square inch, a durometer hardness of about 90 will be indicated. Here again, these figures are to be taken as illustrative and not as limiting the scope of the invention. Aside from the described spacing of the circular toroidal portion 21a from its adjacent surface 14a, the spacing should be adequate for the expansion of that toroidal portion to eliminate the so-called water-hammer when the valve is closed. In this connection, it is to be understood that the chamber between the toroidal part 21a and the surface 14a is sealed to atmosphere, and thus the trapped air within that chamber aids in avoiding water-hammer due to the compression thereof.

The substantial amount of power developed by the magnetic actuator makes possible the movement of the valve member 18 from its fully open position to its closed position in milliseconds.

By reason of the rapid action, water-hammer would ordinarily be expected. However, water-hammer resulting from the sudden stopping of the liquid at the inlet port 12 is avoided by the toroidal-shaped portion 21a of diaphragm 21, since as the valve element 18 engages the seat 17, the sudden stopping of the fluid at the port 12 results in the stretching of the toroidal section 21a outwardly toward and against the somewhat complementary toroidal portion 14a of housing 14. Thus, there is provided within the valve itself the means of preventing water-hammer or pounding in the piping system, the air entrapped between the toroidal portion 21a and its complementary toroidal portion 14a contributing to the elastic cushioning effect.

Figure 3:
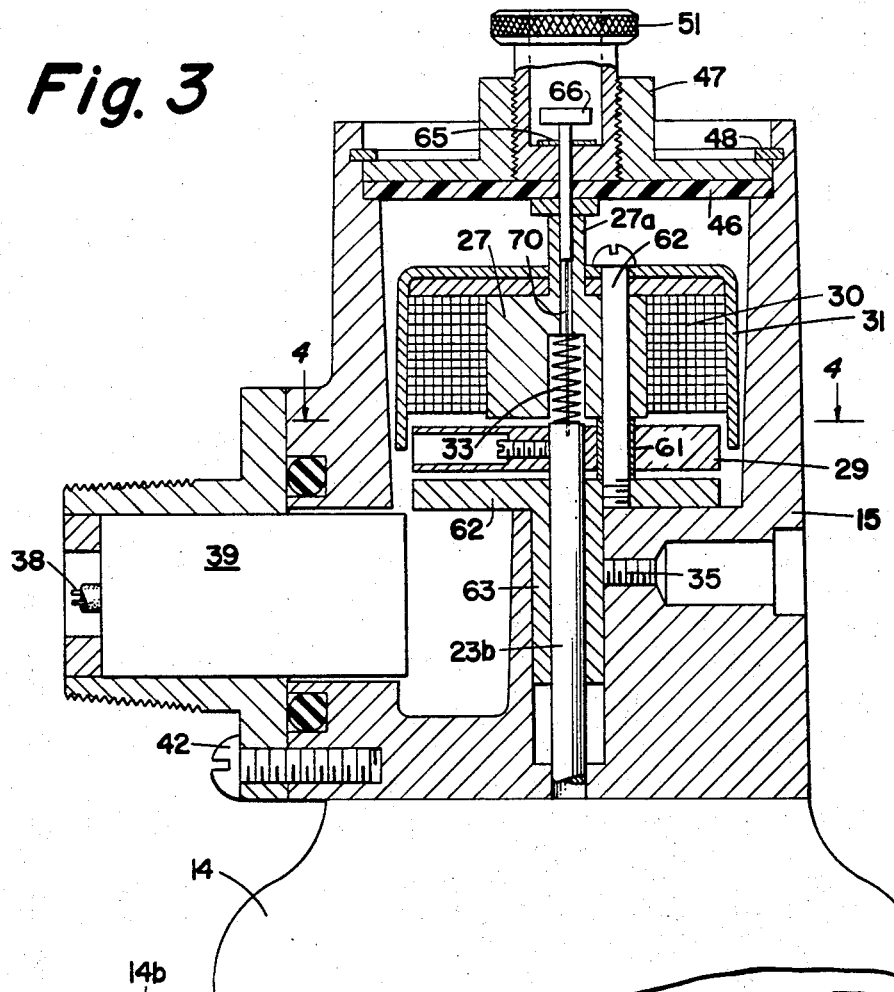
FIG. 3 is a side view partly in section illustrating a normally closed valve and its magnetic actuator.

Referring now to FIG. 3, there has been illustrated the manner in which the present invention may be embodied in a valve of the normally closed type, with a minimum of changes in the arrangement of the parts of the magnetic actuator.

Figure 4:
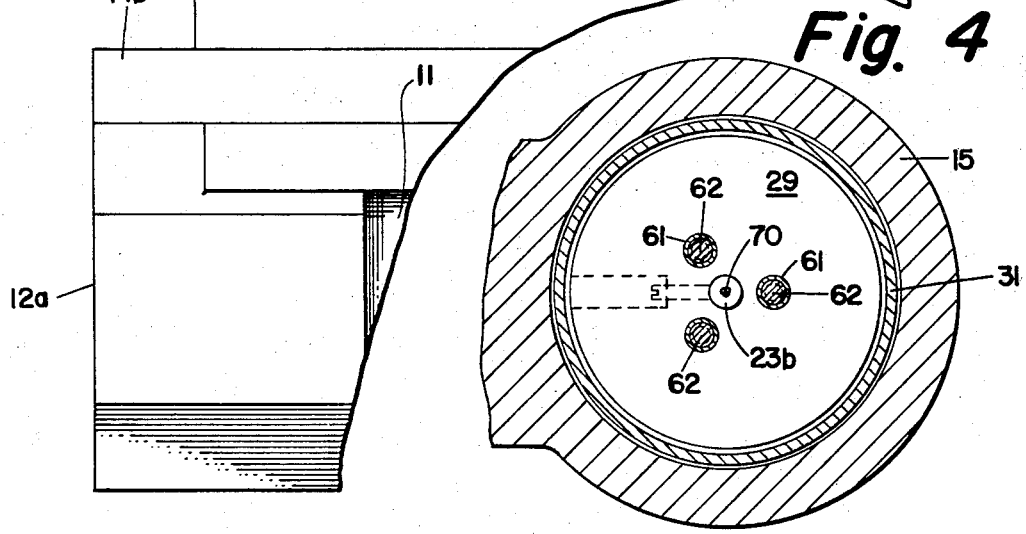
FIG. 4 is a sectional view taken on the line 4—4 of FIG. 3.

Since the valve itself including the valve body 11, the housing 14 and the actuator housing 15 will be identical, only a part of the valve itself has been shown and without the details of the cross sectional view of FIG. 1. Thus, the stem 23b of the valve 10 terminates flush with the surface of the armature 29 of the magnetic actuator. The actuator itself has been turned up-side-down so that the coil 30 is enclosed within the downwardly extending cup-shaped member 31, which is itself held stationary by means of three collars or spacing members 61 of brass and best shown in FIG. 4. Through these collars or spacing members 61 extend three fastening screws 62. The headed ends press against the outer surface of the flat part of the cup-shaped magnetic structure 31 and their opposite threaded ends are secured in the threaded openings of a flange 63a having a downwardly extending tubular member 63 which is itself held in fixed position in the central bore of housing 15 by the set screw 35. The central armature structure 27 has disposed within a central bore a compression spring 33 which presses downwardly on the stem 23b of the valve to bias the valve to closed position. In the closed position, the armature 29 still occupies a position in overlapping relationship with the outer longer lengths of the magnetic assembly formed by the cup-shaped member 31.

It will be seen that upon energizing the coil 30 with direct current, the armature 29 will be quickly drawn towards the central magnetic structure 27 quickly to open the valve. Water-hammer and the like upon closing the valve is avoided as explained above.

In the event of a power failure, it will be possible to open the valve manually by rotating the member 51 which is threaded into the flange member 47. As the knurled member 51 is moved outwardly, its lower end lifts a washer 65 which engages the headed end 66a of a pin 66 extending downwardly into the bore of the tubular portion 27a of the central magnetic structure 27. There extends from the lower end of the stem of headed member 66 a tension element 70 which is secured to the upper end of the valve stem 23b. Thus, as the knurled member 51 continues its upward movement, the tension member 70, which may be a steel wire, a length of steel spring or the like, will lift the valve stem 23b in a direction to open the valve.

Returning now to FIG. 1, it is to be observed that with the valve in the closed position, there is an annular area 20a of the annular reinforcing member 20 exposed to the inlet pressure through inlet port 12 and which acts in a downward direction on the valve member 18. This is in a direction partly to compensate for any back pressure exerted on the valve member 18 and its associated assembly as applied by way of the outlet port 13. The toroidal portion 21a also plays an important part in the balancing of the valve, as earlier explained.

Where it is desired to increase this balancing effect, it will be understood, of course, that the area 20a of member 20 available for the downwardly acting force may be increased as by increasing the diameter of the toroidal portion 21a at the expense of narrowing the diameter of the flat central portion.

As shown in FIG. 5, the toroidal portion 21b itself may occupy a much larger proportion of the space. A larger annular area 20b will then be present to produce balanced-pressure operation.

Now that the principles of the invention have been explained at some length, it will be understood that they may be applied to valves of other types and for varying purposes. For example, in FIG. 6 there has been illustrated a six-way valve 175. This valve utilizes, for example, the actuator 15 more fully described in connection with FIG. 1. It consists of six valve bodies 176, 177, 178, 179, 180 and 181. Two of the bodies, 179 and 181, are members forming closures. The several members are provided with β-rings illustrated in conventional manner and which need not be further described other than to say that they are provided at appropriate points to prevent leakage.

The purpose of the six-way valve 175 is to control the flow of liquids in respect to which there may be a hot stream of liquid entering through a pipe connection 182 and a cold stream entering through a pipe connection 183. The entering stream, depending on the position of the valve, then flows to a heat-exchanger or other utility device, as by way of an outlet pipe connection 184. If this be a heat-exchanger, not illustrated, then the return flow from that exchanger will be by way of a pipe connection 185 and if it be the cold stream, it will exit from the valve by way of a pipe connection 186. If it be the hot stream, it will exit from the valve by way of a pipe connection 187. With the valve in the illustrated position, the arrangement is suitable for air conditioning in which a cold fluid is supplied to the valve where it travels by way of pipe connection 183 and through the valve opening provided by the displacement of the valve member 188 from its cooperating seat 188a. The flow is around a toroidal chamber 189 and thence inwardly to the outlet pipe connection 184 which leads to the heat-exchanger as provided for typical air conditioning systems. The cold fluid returns from the heat-exchanger by the return pipe connection 185 and through the valve opening between valve member 191 and the valve seat 192 and flows outwardly through the pipe connection 186.

When a cool day arrives, or when there is a transfer from summer to winter on an air conditioning system, it is only necessary to deenergize the magnetic actuator 15 for movement of the valve members 187 and 191 to close the previously described valve openings, and thus to provide openings by way of a valve member 196 and its cooperating valve seat 197, a corresponding opening being provided between a valve member 198 and its valve seat 199. As will be obvious from an inspection of the drawing, the flow will then be from the hot inlet connection 182 by way of the outlet pipe connection 184 to the heat-exchanger, with the return through the return pipe connection 185 outwardly to the hot-pipe return connection 187.

It is to be noted that the actuator rod 200 of magnetic actuator 15 has an enlarged portion 200a on which there is mounted in a pressed-fit relationship a cylindrical spacer 201 utilized to provide a good bearing surface for valve member 196 and to facilitate assembly of the valve structure. Another spacer 202 of enlarged diameter is likewise utilized for a stable bearing surface for the valve members 187 and 191 and to maintain a spaced relationship between valve members 187 and 191. A spacer 203 is provided to maintain the spaced relationship between valve members 188 and 196.

The assembly of spacers and valve members is held together on actuator rod 200 by retaining clips, the retaining clip 200b being provided at one end of the assembly and the retaining clip 200c being provided at the other end of the assembly.

The valve members 198 and 191 are provided with metallic backup members 204 and 205. Between backup members 204 and 205 are spacer members 206 between which there are provided fluid passages for flow of the fluid from the return pipe connection 185 outwardly through either of the valves which may then be in the open position.

Where positive actuation is desired in both directions, that is, from energized actuators, the actuator rod 200 may again be reduced in diameter and may pass through the end body member 181 to which a second valve actuator will be secured.

It will be seen at once that there have been utilized again the diaphragms 221 and 221a which may be of the same material and identical to diaphragms 21 which have been thoroughly described above in terms of their operation and their functions in preventing water-hammer or other fluid shocks to the piping system. In this connection, the toroidal chamber 189 is partly enclosed in other toroidal chambers 222 and 223 and which have been found to be effective in absorbing the water-hammer shocks which give so much trouble in many systems.

It is further to be noted that there has been achieved a balanced-construction, that is to say that with the valve in either of its two positions, the fluid pressure acting upon the opposed valve members 187 and 196 in the one case, and 198 and 191 in the second case, do not produce unbalanced forces which must be overcome by the magnetic actuator 15. This is of considerable advantage in reducing the power required of the actuator and in practice, to make the valve practical where high pressures are utilized and in which unbalanced forces of the valve might require inordinate, if not impossible, forces for its operation in terms of practical amounts of effort used to move the valve between its two positions.

The space required for the six-way valve 175 is minimal, yet it has flexibility for widespread applications over and beyond the heat-exchange field, and by utilizing suitable material as explained above in connection with the preceding modifications, it is well adapted for fluids of many and different kinds. These various modifications are intended to be covered by the appended claims.

What is claimed is:

1. A valve having a valve member characterized by the shortness of its stroke between a fully open position and a fully closed position comprising in combination, a valve body having inlet and outlet ports in flow connection one with the other through a passage, a valve seat forming the outer periphery of said passage, said passage, said seat, and said valve member having areas which are large compared with the area of said inlet port thereby to shorten the length of the stroke of said valve member between said fully open and fully closed positions required to equalize the area of flow into or out of said passage with said area of flow of one of said ports, stop means for limiting the movement of said valve member to a stroke-length which provides equalization between said areas of flow, a valve stem, a diaphragm secured to said valve body and to said valve member, and a valve housing secured to said valve body with said outer peripheral portion of said diaphragm clamped therebetween, an intermediate portion of said diaphragm having a toroidal-shaped portion, said valve housing having a complementary toroidal-shaped portion, said valve member and said diaphragm being of a synthetic elastic material whereby upon fast closing of said valve fluid shock will be absorbed by expansion of said toroidal portion of said diaphragm towards said toroidal portion of said housing.

2. A valve having a valve member characterized by the shortness of its stroke between a fully open position and a fully closed position comprising in combination, a valve body having inlet and outlet ports in flow connection one with the other through a passage, a valve seat forming the outer periphery of said passage, said valve member and said valve seat having diameters which provide an area for flow of fluid through said passage which is large compared with the area of said inlet port, thereby to shorten the length of stroke of said valve member between a fully open position and closed position where in the fully open position the area for fluid flow through said passage is at least equal to the area of flow through said inlet port, stop means arresting movement of said valve member in its fully open position as said area for fluid flow through said passage equals the area of flow through said inlet port, a diaphragm having a central flat portion of lesser diameter than said valve member to provide a peripheral area upon which fluid pressure from one of said ports acts in one direction, said diaphragm having an area upon which said fluid pressure acts in an opposite direction, said areas upon which said fluid pressure acts to tend to move said valve member in opposite directions being substantially equal, said diaphragm having an intermediate toroidal-shaped portion and a peripheral flat portion, said diaphragm and said valve member being respectively of a synthetic rubber-like material having elasticity, a valve housing secured to said valve body with the outer peripheral portion of said diaphragm clamped therebetween, said valve housing having a toroidal portion disposed adjacent said toroidal portion of said diaphragm, means for securing together said diaphragm and said valve member for bodily movement one with the other, and means for operating said valve member between open and closed positions where said stroke-length is short and only enough to move said valve member to a position where the flow area to said passage is approximately equal to the area of the flow passage of said port.

3. A magnetically operated valve characterized by the shortness of the stroke of its valve members between fully open positions and fully closed positions comprising in combination, body structure having a plurality of inlet and outlet ports, valve seats for each of said valve members, said valve seats and said valve members having diameters which provide areas for flow of fluid which is large compared with the area of each said ports thereby to shorten said length of said stroke of said valve members required to equalize said areas of flow with the areas of flow of their associated ports, stop means for limiting the movement of said valve member to a stroke-length which provides equalization between said areas of flow, a valve stem, cylindrical spacer members secured to said stem and to selected valve members for slidably mounting said stem in said body structure, means for balancing the forces acting on said valve members due to fluid pressure comprising a resilient diaphragm for each of them clamped at its outer periphery to said body structure and secured to a valve member in spaced relation with its periphery, thereby to provide a peripheral area upon which fluid pressure from the associated port acts in one direction, each said diaphragm having an area upon which said fluid pressure acts in the opposite direction, said areas upon which said fluid pressure acts to tend to move said valve members in opposite directions being substantially equal, and a magnetic actuator having an actuating coil, stationary inner and outer magnetic core structure, and an armature connected to said valve stem, said outer core structure including a cup-shaped portion surrounding said coil and of slightly greater length than that of said inner core structure for disposition of said armature in overlapping and spaced relation therewith throughout said length of said stroke.

4. A six-way valve characterized by the shortness of the stroke of its valve members between their two limiting positions comprising in combination, body structure having two inlet, two outlet, and two additional ports in flow connection one with the other under the control of said valve members, valve seats for each said valve member, said valve members and said valve seats having diameters which are large compared with each area of said ports, thereby to shorten the length of said stroke required to equalize said areas of flow with the areas of flow of their associated ports, stop means for limiting the movement of said valve member to a stroke-length which provides equalization between said areas of flow, a valve stem, and means securing said valve members to said stem to open passages between a selected inlet port and one of said additional ports and between the other of said additional ports and a selected one of said outlet ports with said valve in one of its limiting positions and in the other of its limiting positions interconnecting the other of said inlet ports to the other of said outlet ports.

5. The six-way valve of claim 4 in which means are provided to prevent water-hammer comprising sealed cavities in said body structure, each said cavity being sealed by an elastic member, each said cavity and each said elastic member being disposed adjacent an associated one of said valve members with said elastic member exposed to fluid pressure from the inlet port of the last-mentioned valve member, which upon occurrence of fluid-shock compresses air trapped in each said cavity to absorb same.

6. A six-way valve characterized by the shortness of its stroke between each of its two positions comprising five body structures, a valve stem extending through at least four of said body structures, a first of said body structures having two outlet ports, a return port, and a valve seat, a second of said body structures having a valve seat, valve members supported by said stem between said valve seats for moving them selectively to control fluid flow from said return port to one of said outlet ports, a third of said body structures having two inlet ports, two valve seats, and an outlet port, valve members supported by said stem and movable against one or the other of said last-named seats as said first-named valve members are moved against their said seats, one of said inlet ports being in communication with one of said outlet ports under control of said valve members associated with said body structures, said valve seats and said valve members having large diameters compared with any one of said ports, and means for moving said stem for simultaneous movement of said valve members for control of fluid entering through said inlet ports.

7. A six-way valve characterized by the shortness of its stroke between each of two positions comprising six body members, a valve stem extending through at least five of said body members, a first of said body members having two inlet ports, one outlet port and two valve seats, a first pair of valve members spaced one from the other for cooperation respectively with said last-named valve seats, a second of said body members having an inlet port, two outlet ports and a valve seat, a third of said body members having an opposing valve seat, a second pair of valve members spaced one from the other for cooperation respectively with said last-named valve seats, spaced supporting members extending between said second pair of valve members and between which supporting members there are provided fluid passages leading to the respective valve seats, diaphragms carried by two of said valve members including toroidal portions exposed to the controlled pressure for absorbing fluid shocks upon quick closing of one of said valve members against its cooperating valve seat, and means securing said body members together to form a unitary valve construction.

8. A magnetically operated valve having a valve member characterized by the shortness of its stroke between a fully open position and a fully closed position comprising in combination, a valve body having inlet and outlet ports in flow connection one with the other through a passage, a valve seat forming the outer periphery of said passage, said passage, said seat, and said valve member having diameters which provide areas which are large compared with the area of flow of one of said ports, thereby to shorten the length of said stroke of said valve member between said fully open and closed positions required to equalize the area of flow into or out of said passage with said area of flow of one of said ports, stop means for limiting the movement of said valve member to a stroke-length which provides equalization between said areas of flow, a valve stem, a diaphragm having its mid-portion secured to said valve member, said valve member and said diaphragm both being made of a synthetic rubber-like material, supporting members carried by said stem in positions to place under compression both said diaphragm and said valve member, said diaphragm having a toroidal section intermediate its said outer peripheral portion and a central flat portion disposed between said supporting members, a valve housing secured to said valve body with the outer peripheral portion of said diaphragm clamped therebetween, said housing having a toroidal portion spaced from said toroidal portion of said diaphragm whereby upon sudden closing of said valve said toroidal portion of said diaphragm can expand elastically to absorb fluid shock and resulting water-hammer, a magnetic actuator having an actuating coil, stationary inner and outer magnetic core structures, and an armature connected to said valve stem, said outer core structure including a cup-shaped portion surrounding said coil and of slightly greater length than that of said inner core structure for disposition of said armature in overlapping and spaced relation therebetween, said area of said passage being sufficiently greater than that of said one of said ports for movement of said armature in overlapping relation with said cup-shaped portion throughout said length of said stroke.

9. A valve having a valve member characterized by the shortness of its stroke between a fully open position and a fully closed position comprising in combination, a valve body having inlet and outlet ports in flow connection one with the other through a passage, a valve seat forming the outer periphery of said passage, said passage, said seat, and said valve member having areas which are large compared with the area of flow of one of said ports thereby to shorten the length of the stroke of said valve member between said fully open and fully closed positions required to equalize the area of flow into or out of said passage with said area of flow of one of said ports, stop means for limiting the movement of said valve member to a stroke-length which provides equalization between said areas of flow, means for balancing the forces acting on said valve member due to fluid pressure comprising a resilient diaphragm clamped at its outer periphery to said valve body and secured to said valve member in spaced relation with its periphery, thereby to provide a peripheral area upon which fluid pressure from one of said ports acts in one direction, said diaphragm having an area upon which said fluid pressure acts in an opposite direction, said areas upon which said fluid pressure acts to tend to move said valve member in opposite directions being substantially equal, said diaphragm at its periphery having an enlarged cross-sectional area disposed in clamping grooves, and between its periphery and said valve member being of toroidal shape and so spaced from an adjacent wall of said valve body as to absorb fluid-shock on rapid closing of the valve, said diaphragm having a flat disc-shaped center portion opposite said valve member, and means engaging said valve member for moving it between said open and closed positions.

References Cited

UNITED STATES PATENTS

| | | | |
|---|---|---|---|
| 1,389,056 | 8/1921 | Lane | 251—129 |
| 2,465,036 | 3/1949 | Ray | 251—129 |
| 2,768,790 | 10/1956 | Frey | 251—130 X |
| 2,912,009 | 11/1959 | Cooksley | 137—625.65 |
| 2,992,304 | 7/1961 | Andrews | 335—261 |
| 3,034,761 | 5/1962 | Janquart | 251—129 X |
| 3,134,932 | 5/1964 | Ray | 251—141 X |

FOREIGN PATENTS 299,215  6/1917  Germany.

WILLIAM F. O'DEA, *Primary Examiner.*

DENNIS H. LAMBERT, *Assistant Examiner.*